United States Patent [19]

Geiger et al.

[11] 4,050,187
[45] Sept. 27, 1977

[54] WIRE SUPPORT SYSTEM FOR TRAINING HOP VINES

[75] Inventors: Albert Geiger, Garmisch-Partenkirchen; Peter Bruckmann, Grainau, both of Germany

[73] Assignee: Geiger Plastic KG, Garmisch-Partenkirchen, Germany

[21] Appl. No.: 623,453

[22] Filed: Oct. 17, 1975

[30] Foreign Application Priority Data

Oct. 22, 1974 Germany .............. 2450062

[51] Int. Cl.² .............. A01G 17/06
[52] U.S. Cl. .............. 47/45; 24/73 HR; 24/237
[58] Field of Search .............. 47/42, 43, 44, 45, 46, 47/47; 24/84 R, 84 B, 83 B, 73 HH, 130, 230.5 TP, 137 R, 237, 73 HR, 230.5 S, 241 R, 81 DM, 237

[56] References Cited

U.S. PATENT DOCUMENTS

| | | | |
|---|---|---|---|
| 23,338 | 3/1859 | Aylesworth | 47/46 |
| 294,240 | 2/1884 | Judd | 47/46 |
| 810,004 | 1/1906 | Tabler | 24/84 R |
| 928,006 | 7/1909 | Thomas | 24/83 B |
| 1,146,641 | 7/1915 | Minnich | 24/84 B |
| 1,189,199 | 6/1916 | Hachmann | 24/73 HH |
| 1,206,074 | 11/1916 | Zwiener et al. | 24/73 HH |
| 1,446,781 | 2/1923 | Benson | 24/130 |
| 1,547,677 | 7/1925 | Ouellet | 24/73 HH |
| 1,773,042 | 8/1930 | Jones | 24/84 R |
| 2,064,591 | 12/1936 | David | 24/73 HH |
| 2,317,368 | 4/1943 | Frey | 24/130 |
| 2,842,898 | 7/1958 | Buckles | 47/46 |
| 2,862,334 | 12/1958 | Sandvig | 47/47 |
| 3,879,812 | 4/1975 | Clinch | 24/230.5 TP |

FOREIGN PATENT DOCUMENTS

| | | | |
|---|---|---|---|
| 583,359 | 1/1925 | France | 47/46 |
| 3,491 of | 1893 | United Kingdom | 47/46 |

*Primary Examiner*—Edgar S. Burr
*Assistant Examiner*—James R. Feyrer
*Attorney, Agent, or Firm*—Michael J. Striker

[57] ABSTRACT

The wire systems for training hop vines normally comprise a trellis of generally horizontal main wires and, connected therewith, riser wires which extend generally vertically. The invention provides riser strands which at their upper end have a loop integrally formed therewith and which are connected to the horizontal main wires by a hook. Each hook has narrow partially open eyes formed at both ends of the hook, one being at the upper end of the hook and the other being at its lower end. The loop of the riser strand is hooked into the lower eye of the hook, while the hook itself is suspended from the horizontal main wire which is forceably moved into the upper eye of the hook so as to receive the horizontal wire.

10 Claims, 4 Drawing Figures

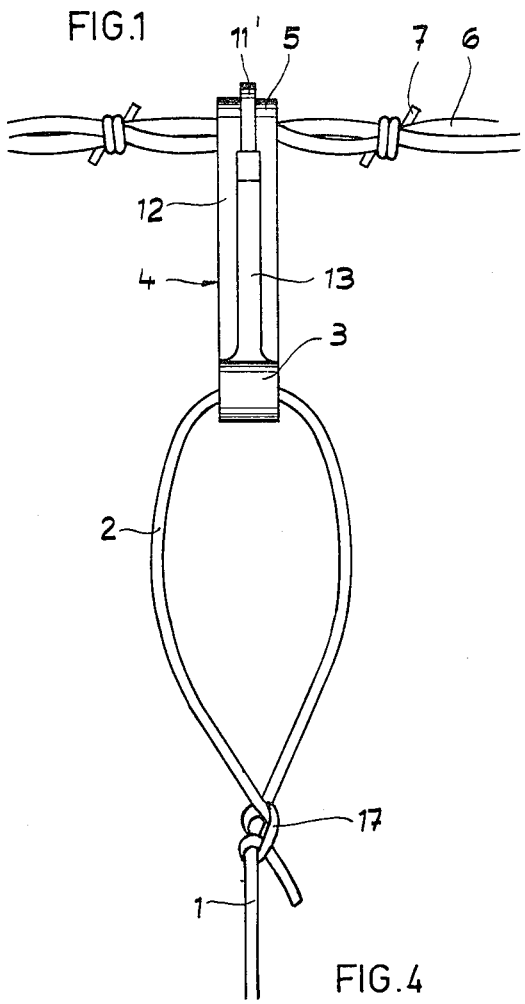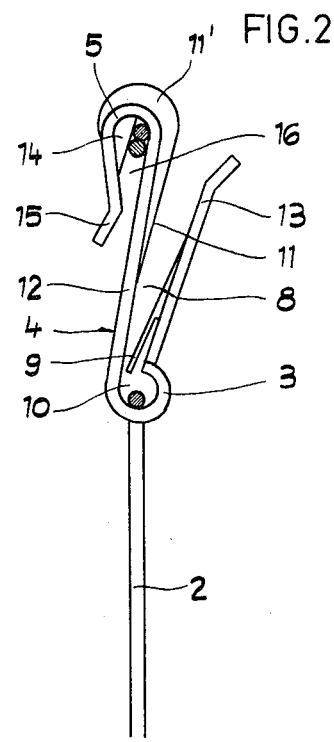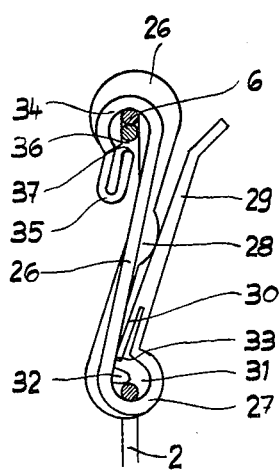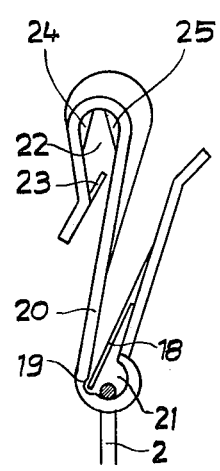

WIRE SUPPORT SYSTEM FOR TRAINING HOP VINES

BACKGROUND OF THE INVENTION

In the cultivation of hops support structures or trellises are used which consist of stakes anchored in the ground and connected by longitudinal, that is, generally horizontally extending wires. To twine the hop vines, guide or riser wires are provided which extend parallel to each other and in spaced relationship and generally accordingly are a direction across to the horizontal wires of the support structure. One end of the vertical wires is pegged in the ground, while the other end is connected with the horizontal main wires.

The hop plants twine around these riser wires during their growth until they reach the longitudinal wires which extend at a height of 7 to 8 meters above ground, and then climb over the horizontal wires and further branch out during their growth. After a harvest the support structure as such remains preserved. However, the plants with the riser wires are torn down at the time of the harvest and moved to the picking machine. The unused remainders of the plants are then destroyed together with the riser wires, for instance by chopping or burning.

The securing of the riser or vertical wires is generally effected from a hydraulically lifted staging disposed on a vehicle which passes through the rows of plants. It is carried out accordingly several meters above the ground. It stands to reason that the work on the movable staging because of the uneven ground which must be traversed by the vehicle is difficult and requires skill. This, however, is necessary to connect the riser wires to the main horizontal wires. Black lacquered iron riser wires have long been used for the guiding up of the plants. The free end of the riser wire which is opposite the end peg in the ground is connected with the horizontal wire by coiling around the same or spiral coiling of the end of the riser wires about itself after bending it back. These black iron wires have particularly the shortcoming that in spite of the lacquer coating they have a tendency to corrode at the surface or, particularly at the places of friction, that is including the places where they are fastened, they have a tendency to rust throughout their cross section. This surface or through-rusting can also occur if the total storage supply is not used up for one harvest by the farmer. This occurs particularly since the wire normally is stored in a condition coiled around big rolls. It frequently is stored in a less than proper manner. If the surface corrosion results in an untimely through-corrosion or if the surface corroded wire tears because of the weight of the plant, the vines drop down prior to the harvest and must be twined again individually in a time-consuming manner. Besides, the iron wires require a strength of about 1.2 mm diameter and therefore are expensive and heavy.

It has also been proposed to replace the comparatively expensive easily corrodable black iron wire by a yarn of plastic material or a rope of the same material which consists of a multiplicity of slightly twisted monofilaments. These riser yarns of plastic material, however, have the shortcoming when compared with the iron wires that they are difficult to tie because of the lack of flexibility and the smoothness of their surface since the tying has to be performed at the place of use. Besides the fastening to the horizontal wire comes off easily when the vertical wire is subjected to a tensile stress.

To counter this shortcoming the German Gebrauchsmuster No. 7,216,343 (not published in print) proposes to use definite performed lengths of yarns which correspond to the required length of each individual riser wire and to provide them with a device for securing them to the other wire in the form of a welded-on or sprayed-on reinforcing body which prevents that the fast end escapes from the loop or knot.

Riser yarns of this type are fairly difficult to make since the yarn furnished by the supplier in rolls or coils must be sprayed around its surface with a plastic material at spaced internals. Multiple molds can be used for this purpose only in a limited way. Also, the tearing down of the wire at the time of the harvest or immediately thereafter as wanted by the farmers could not always be guaranteed.

German Gebrauchsmuster No. 7,304,350 which likewise has not been published in print, proposes a fastener for the riser wires consisting of a plastic monofilament which consists of a hook-shaped body of plastic material. The fastening shank of the body has an aperture which is adapted to the diameter of a terminal knot of a slightly twisted guide cord. In this manner a self-jamming of the end of the cord which is formed with a knot in the slot of the hook should be accomplished.

However, apart from the fact that the cords could not be torn definitely at the time of the harvest, it was also very difficult for the operator standing on the staging to thread the ends of the rope into the slots of the hook. As a consequence, the hook had to be taken off after each harvest and had to be supplied with a new cord prior to the next harvest in order to suspend it again from the horizontal wires.

It is also particularly difficult to chop the multiplicity of thin filaments which form the slightly twisted yarns of the riser wire after the harvest together with the harvested plants. They have a tendency to get jammed in the chopper knife, to coil around the chopper shaft and thus to cause an overheating which results in their burning up with the formation of melt lumps if the chopping machine is not totally disabled and stopped.

A long time ago it has also been proposed to suspend S-shaped iron hooks similar to so-called butcher hooks from the horizontal main wires and to fasten the riser wires in the lower curved end of the hook in a specific manner. This was accomplished by coiling around the lower shank of the hook or to hook them by means of a so-called "cuckoo" from a wire loop. If after, or at the time of the harvest, there was a pull at the riser wires, the S-shaped comparatively large and widely curved hooks frequently were hurled up, and detached from the horizontal wires caused injury to the farmer.

In spite of the many proposals and suggestions in this area, so far no satisfactory riser wire system has been found which meets the requirements of the farmers.

It is therefore an object of the invention to provide for a riser wire system for hop vines which combines the advantages of the iron wire with the wires made of plastic materials but does not involve the shortcomings of the old systems which have been described above. Besides, it should help to save time and expense and accordingly result in better harvest yields.

SUMMARY OF THE INVENTION

The invention resides in a system for training hop vines by means of a trellis of generally horizontal main wires and, connected therewith, generally vertical riser wires. The improvement of the invention comprises riser wires provided at their upper end with a loop integrally formed with the wire by a knot; a hook for the main wire and the strand; narrow partially open eyes formed at both ends of said hook, one at the upper and the other at the lower end and the loop of the riser strand being adapted to be hooked into the lower eye of said hook, and the hook being adapted to receive the horizontal wire in its upper eye so as to connect the horizontal wires and the riser strands.

BRIEF DESCRIPTION OF THE DRAWINGS

FIG. 1 is a front view of a hook and part of a riser wire which form part of the invention;
FIG. 2 is a side view of the hook shown in FIG. 1;
FIG. 3 is a side view of a modification of the hook;
FIG. 4 is a similar view of another modification.

DESCRIPTION OF THE INVENTION AND OF PREFERRED EMBODIMENTS

The hooking of a loop in the invention is a process which can easily be carried out from the staging of the customary vehicles employed in the hop cultivation. It is considerably faster than the threading of a cord provided with a terminal knot into the hole of a hook. It is even simpler and faster than the securing of a black iron riser wire with its end on a vertical main strand by coiling around it. If it is possible to retain the hooks for several years at the same place, and since they neither are moved sidewise nor snap off when the riser wires are torn down, the farmers can immediately locate the place for the next harvest. Formerly it was frequently difficult to do this from the staging of the vehicle.

All this is now possible by the invention.

By using the instant invention it is possible to guarantee the safe adhering of the vines and avoid a sliding down of the growing and therefore heavier plants which have not yet reached the horizontal wires. This is accomplished better even than with twined or corrugated plastic cords or threads and still better than with iron riser wires.

Tests have shown that an iron riser wire, just as a plastic yarn, can be pulled out of a plant. This does not occur in case of the use of smooth surface riser strands as proposed by the present invention. It happens in addition that the plant during growth frequently coils around the strands of the invention and since the number of sprouts depends on the number of coils the invention results in improvement of the harvest yield.

The smooth monofilament of the invention in spite of its improved properties is easier to manufacture than a twined thread and moreover is less expensive. Its loop can be hooked into the eye of the hook with one hand while the operator can hold on with the other hand to the staging. The weight of the strands is very low in spite of its high tensile strength and in spite of the strength it can easily be torn down at the time of the harvest and does not cause any difficulty in the subsequent chopping of the material.

Part of the invention is a smooth monofilament. This type of plastic strand in German practice is called "Aufleitdraht". This riser strand is in conventional manner pegged in the ground for instance by means of a steel rod while the other end of the strand is formed as a loop 2. The loop is suspended in an eye 3 of a hook 4. The other eye 5 of the hook is suspended from the horizontal wire 6 of the trellis.

The securing of the riser strand normally is effected in the following way. The previously tied loop 2 is hooked into the hook 4 which still exists from the preceding year, more particularly, into its lower eye 3. The strand 1 is then secured in the ground by means of a peg. The loops 2 preferably are pretied by machine and the risers are precut in the lengths desired. Packs of several hundred strands 1 provided with loops 2 can for instance be assembled together in vertical position in a tube that is arranged on the staging. They can then be withdrawn individually as necessary. To prevent that in case of even heavier packs, several strand may inadvertently be pulled together, it is also possible to provide the tubing for instance at its top opening with a collar which is adjustable as to its diameter and can be handled from the outside. This collar may exert a slight pressure on the mass of strands and thus cause a slight friction between the individual strands.

The hooks 4 are formed in a manner to prevent pulling out of the loops 2 from the lower eye after having hooked into the eye. Likewise, the upper eye is formed to prevent any sidewise movement of the hook which may particularly occur in case of a storm. Thus, the farmer can replace the heretofore used dangerous barbed wire type horizontal wires, which prevented the sidewise moving, by smooth vertical wires where the barbs 7 can be dispensed. This also makes the work of the farmer easier since he does not have to watch that the vertical wire projects sufficiently across the particular plant which anyway is difficult from the raised staging. The hook, once it has been secured to the right place, remains there for its lifetime. The hooks accordingly are chosen regarding their material to permit use for several successive years.

In order to prevent the slipping out of the loop 2 of the wire 1 from the eye 3 of the hook, the inlet channel 8 is provided at its lower end with a spring tongue 9 which covers the top of the eye opening 10.

The inlet channel 8 is formed by the rear side 11 of the main part 12 of the hook 4 and a comparatively long angled shank 13 which extends into the free end of the eye 3 and close to below the upper eye 5. This permits an easy hooking of the device.

11' is a reinforcing rib which extends from the central portion 12.

To secure a definite fastening of the hook 4 on the horizontal wire 6 provision has been made to provide the upper eye 5 with a thin inner rib 14 which is thin as compared with the width of the eye. Extending from the tongue 15 this rib creates a crosswise decreasing slot in the direction of the portion 11'.

17 is the tie of the riser strand which forms the loop 2.

The hook of FIG. 3 is somewhat different from that of FIGS. 1 and 2. The spring tongue 18 which corresponds to the spring tongue 9 of FIG. 2 is lengthened to reach to a point close to a notch 19 in the main body 20 of the hook or also to extend right into the notch. This is a further obstacle to the slipping out of the loop 2 from the eye opening 21.

The upper eye and the slot 22 which receive the horizontal wire of the trellis are furthermore partly blocked by a spring tongue 23. In addition the slot is formed by two opposed interior ribs 24 and 25. The spring tongue 23 prevents a snapping up of the hook when the vertical riser strands 1 are torn off during the harvest. This is important inasmuch as the hooks are intended to stay in place during several harvests.

In the modification of FIG. 3 it will be noted that the main body 26 of the shank or its rib 26' have a projection or boss 28 on the face that is directed towards eye 27. The shank 29 or the spring 30 are adapted to abut the boss 28 under tension. Thus, the hooking of the loop 2 of the riser strand is not in any way impeded because the wire can easily be pulled around boss 28 by spreading the shank 29 outwardly. On the other hand, the slipping out of the loop is considerably more difficult, among others, because there is then no short sharp pull exerted on the loop as during insertion and the loop cannot easily pass the normally blocked space between the boss 28 and the shank 29 or spring 30 particularly since this has to be done at a place where the lever of the shank is shorter than during insertion of the loop.

Since the shank 29 presses under tension against the boss 28 this also brings the spring tongue 30 into contact with the inner face of the main body 26 of the hook. This additionally is an obstacle to slipping out of the loop. In addition there may be a shoulder 32 in the eye opening 31 as appears from the drawing which, in case of an upwards movement of the loop, would press the loop against the inner face 32 of the spring 30.

All this will block the slipping out of the loop with certainty.

The upper eye 34 as shown in FIG. 4 extends into a U-shaped spring element 35 whose inner shank facing part 26 opens up the slot 36 when the horizontal wires 6 are inserted into the device. If this inner shank then springs back into the position shown in the drawing, it will block the path which the horizontal wire 6 would have to follow to leave the hook. This blocking is accomplished by the free edge 37 of the spring element.

The monofilaments forming the rising strands are made of plastic material which, on the one hand, must have sufficient strength not to tear in case of a storm or weather catastrophe during the growth of the plant, while on the other hand it must be adapted to be torn down during the harvest by a sudden sharp pull. This is possible by choosing the proper material which would permit to have a time adjusted aging process. The aging is most likely accelerated by the knot 17 and the sharp ends and tensions arising at the place of the knot. The riser strands which have been installed in spring or shortly after the harvest can then be easily torn down during the next harvest.

The riser strand of the invention has in addition an entirely smooth surface. Contrary to a long existing prejudice this will prevent the slipping off of the plants much better than the conventional roughened or otherwise prepared threads, cords or wires. A particularly suited material is a terephthalic polyester such as are made from the material sold under the trademark Terylen.

Since the hooks need replacement only once every few years they can be marked with special indicia, for instance with a stamped-on year or different colors can be used for different years in order to enable the farmer to know when, after several harvests, the hooks require replacement.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A trellis system for training hop vines comprising:
generally horizontal main wires and, connected therewith, generally vertical riser strands; each riser strand being a monofilament of plastic material having a pre-formed loop at its upper end,
a hook for each riser strand; said hook comprising narrow partially open eyes formed at opposite ends of said hook, and the said loop of the riser strands being adapted to be hooked into the lowermost eye of said hook, said hook being adapted to receive the generally horizontal main wires in its upper eye to connect said riser strands to said generally horizontal main wires,
the riser strand material being a smooth-surface synthetic degradable plastic material strong enough to support the plants during their normal growing season and subject to a loss of strength due to aging during said season between the time of installation of said riser strands and the harvesting of said hop vines such that said riser strands can be easily torn down at the harvest time; the material of the hooks being such that they will perform satisfactorily during several successive seasons.

2. The system of claim 1 wherein the said riser wires substantially consist of a terephthalic polyester.

3. The system of claim 1 wherein said loops are pretied by machine.

4. The system of claim 1 wherein a projecting shoulder is provided in said lowermost eye to effect an additional partial closure of said lowermost eye and thus to keep the riser wire in place.

5. The system of claim 1 wherein the pre-tied loops of the riser wires are knotted to an extent to cause an accelerated aging of the riser strands at overlapping loop portions.

6. The system of claim 1 wherein an elongated shank extends from the free end of the lowermost hook eye at an angle to the vertical axis of said lower eye, the said shank and the main body of said hook forming an extended inlet channel for said loop of the riser strand.

7. The system of claim 6 wherein a spring tongue extends from the inner end of said shank into said lower eye to partially close the same when at rest.

8. The system of claim 7 wherein a boss is provided on the inner face of said hook opposite said shank and wherein said shank is under tension unless forced open.

9. The system of claim 7 wherein a boss is provided on the inner face of said hook opposite said shank and wherein said shank is under tension and wherein said boss and spring tonque abut each other unless forced open.

10. The system of claim 7 comprising a notch provided on said hook said the spring tongue extending into said notch.

* * * * *